United States Patent
Kauppinen et al.

(10) Patent No.: US 8,985,280 B2
(45) Date of Patent: Mar. 24, 2015

(54) METHOD AND ELEVATOR ASSEMBLIES LIMITING LOADING OF ELEVATORS BY MODIFYING MOVEMENT MAGNITUDE VALUE

(71) Applicants: Tuukka Kauppinen, Suzhou (CN); Joakim Modeen, Espoo (FI); Tomi Sipilä, Espoo (FI)

(72) Inventors: Tuukka Kauppinen, Suzhou (CN); Joakim Modeen, Espoo (FI); Tomi Sipilä, Espoo (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 13/680,537

(22) Filed: Nov. 19, 2012

(65) Prior Publication Data
US 2013/0075199 A1  Mar. 28, 2013

Related U.S. Application Data (63) Continuation of application No. PCT/FI2011/050452, filed on May 17, 2011.

(30) Foreign Application Priority Data

May 25, 2010 (FI) .................................... 20105587
May 28, 2010 (FI) .................................... 20100220

(51) Int. Cl.
   *B66B 1/34* (2006.01)
   *B66B 1/28* (2006.01)
   *B66B 1/30* (2006.01)

(52) U.S. Cl.
   CPC ... *B66B 1/28* (2013.01); *B66B 1/30* (2013.01); *B66B 1/308* (2013.01); *Y02B 50/125* (2013.01)
   USPC ........................... 187/393; 187/392; 187/382

(58) Field of Classification Search
   CPC ............ B66B 1/28; B66B 1/30; B66B 1/308; B66B 1/285
   USPC ......... 187/247, 248, 277, 287, 288, 289, 290, 187/293, 295, 296, 297
   See application file for complete search history.

(56) References Cited

U.S. PATENT DOCUMENTS 3,902,572 A * 9/1975 Ostrander ...................... 187/293
4,499,974 A * 2/1985 Nguyen et al. ................. 187/294

(Continued)

FOREIGN PATENT DOCUMENTS

EP   0406771 A2   1/1991
EP   1927567 A1   6/2008

(Continued)

OTHER PUBLICATIONS

International Search Report PCT/ISA/210 for International Application No. PCT/FI2011/050452 dated Jul. 22, 2011.

(Continued)

*Primary Examiner* — Anthony Salata
(74) *Attorney, Agent, or Firm* — Harness, Dickey & Pierce, P.L.C.

(57) ABSTRACT

In a method for limiting loading of an elevator assembly, a limit value for a maximum permitted loading is set for one or more parts of the elevator assembly, and a loading of the one or more parts of the elevator assembly is determined. A movement magnitude value of the elevator car in the movement profile of the elevator car is modified to limit the loading of the one or more parts of the elevator assembly if the loading of the one or more parts of the elevator assembly exceeds the limit value for the maximum permitted loading.

16 Claims, 3 Drawing Sheets

(56) References Cited

U.S. PATENT DOCUMENTS

| | | | |
|---|---|---|---|
| 4,501,344 A * | 2/1985 | Uherek et al. | 187/295 |
| 4,544,873 A * | 10/1985 | Salihi et al. | 318/801 |
| 4,751,984 A * | 6/1988 | Williams et al. | 187/293 |
| 4,982,816 A * | 1/1991 | Doi et al. | 187/296 |
| 5,141,141 A | 8/1992 | Leone | 224/587 |
| 5,266,757 A * | 11/1993 | Krapek et al. | 187/295 |
| 5,298,695 A * | 3/1994 | Bahjat et al. | 187/295 |
| 5,407,028 A * | 4/1995 | Jamieson et al. | 187/288 |
| 5,894,910 A | 4/1999 | Suur-Askola et al. | |
| 5,984,052 A | 11/1999 | Cloux et al. | |
| 6,199,667 B1 * | 3/2001 | Fischgold et al. | 187/295 |
| 6,311,802 B1 * | 11/2001 | Choi et al. | 187/293 |
| 7,011,184 B2 * | 3/2006 | Smith et al. | 187/281 |
| 7,575,100 B2 * | 8/2009 | Kugiya et al. | 187/305 |
| 7,740,112 B2 * | 6/2010 | Iwata et al. | 187/393 |
| 7,891,467 B2 * | 2/2011 | Kattainen et al. | 187/394 |
| 8,127,894 B2 * | 3/2012 | Agirman et al. | 187/290 |
| 8,297,411 B2 * | 10/2012 | Hashimoto et al. | 187/288 |
| 8,371,420 B2 * | 2/2013 | Kondo et al. | 187/288 |
| 8,408,364 B2 * | 4/2013 | Kangas | 187/393 |
| 8,439,168 B2 * | 5/2013 | Kondo et al. | 187/295 |
| 2008/0185234 A1 | 8/2008 | Harkonen | |
| 2009/0045016 A1 | 2/2009 | Iwata et al. | |
| 2011/0226559 A1 * | 9/2011 | Chen et al. | 187/290 |

FOREIGN PATENT DOCUMENTS

| | | |
|---|---|---|
| WO | WO-9617798 A1 | 6/1996 |
| WO | WO-2007042603 A1 | 4/2007 |

OTHER PUBLICATIONS

Finnish Search Report for Finnish Application No. 20100220 dated Dec. 1, 2010.

* cited by examiner

METHOD AND ELEVATOR ASSEMBLIES LIMITING LOADING OF ELEVATORS BY MODIFYING MOVEMENT MAGNITUDE VALUE

CROSS REFERENCE TO RELATED APPLICATIONS

This is a continuation of PCT/FI2011/050452 filed May 17, 2011, which is an International Application claiming priority to FI 20105587 filed on May 25, 2010, and FI 20100220 filed on May 28, 2010, the entire contents of each of which are hereby incorporated by reference.

FIELD OF THE INVENTION

The invention relates to solutions for preventing the overloading of an elevator assembly.

BACKGROUND OF THE INVENTION

An elevator assembly of a building can comprise a number of elevators. Each of the elevators normally comprises an elevator car and also an electric drive for moving the elevator car. The electric drive comprises a hoisting machine of the elevator and also a power supply apparatus, such as a frequency converter, of the hoisting machine. The elevator car is moved in the elevator hoistway e.g. with suspension ropes traveling via the traction sheave of the hoisting machine of the elevator.

The loading of an elevator assembly varies according to the operating situation. The elevator car and the counterweight are suspended on different sides of the traction sheave such that their weight difference produces a force difference acting on the traction sheave, which force difference in turn affects the magnitude of the torque needed from the elevator motor when driving the elevator. When the torque requirement of the elevator motor increases, the current of the elevator motor also increases. Simultaneously the number and load of the elevators in operation therefore affect e.g. the magnitude of the current needed from the electricity supply of the elevator assembly. On the other hand, an increase in the current of the elevator motor increases the loading exerted on the elevator motor and also on e.g. the frequency converter supplying power to the elevator motor. When the current increases the copper losses of the elevator motor increase; likewise, the current of the solid-state switches, such as IGBT transistors, of the frequency converter increases when the current of the elevator motor increases.

The aim is to increase the performance of an elevator assembly by increasing e.g. the speed and acceleration of the elevator car to as close as possible to the maximum possible value set by the dimensioning of the elevator assembly. Increasing the speed/acceleration of the elevator car, however, increases the loading exerted on the different parts of the elevator assembly. Attempts to improve the performance of an elevator assembly might result in service outages owing to overloading of the elevator assembly.

Experts subordinate to, and under the direction of, the applicant are thus continuously striving to develop control methods and operating methods of an elevator motor for improving the performance of an elevator assembly.

SUMMARY OF THE INVENTION

The aim of the invention is to provide a solution to the problem, for improving the performance and for safeguarding continuity of operation of an elevator assembly in changing traffic situations. A method for limiting loading of an elevator assembly, and an elevator assembly are provided.

In the method according to the invention for limiting the loading of an elevator assembly a plurality of optional operational objectives are determined for the elevator traffic, one or more of these at a time are selected to be implemented as an operational objective of the elevator traffic using the selection criteria of the operational objective, and a movement profile of the elevator car is formed on the basis of one or more selected operational objectives. In a preferred embodiment of the invention a limit value is further set for the maximum permitted loading for one or more parts of the elevator assembly, the loading of the aforementioned one or more parts of the elevator assembly is determined, and if it is deduced that the loading of the aforementioned one or more parts of the elevator assembly exceeds the limit value for the maximum permitted loading, the loading of the one or more parts in question of the elevator assembly is limited by modifying the value of the movement magnitude of the elevator car in the movement profile of the elevator car such that the movement according to the modified movement profile of the elevator car causes limiting of the loading of the one or more parts of the elevator assembly when the limit value for the maximum permitted loading in question is reached. The loading of one or more parts of the elevator assembly can in this case be limited to the limit value for the maximum permitted loading or to smaller than this. The selection criterion for an operational objective can be supplied to the elevator assembly e.g. via a user interface belonging to the elevator assembly. Selection criteria can also be supplied e.g. from a monitoring center via a communication link between the elevator assembly and the monitoring center. On the other hand, the elevator assembly can also be self-learning, in which case the elevator assembly can e.g. measure the operation of an elevator/elevators e.g. as a function of the time of day and/or date and further set selection criteria such that selection criteria that differ from each other at least partly are used at different times of day and/or on different dates. The term movement profile of an elevator car refers here to a target profile set for movement magnitudes of the elevator car, such as for jerk and/or for acceleration and/or for deceleration and/or for speed. One preferred optional operational objective of the elevator traffic is the serving of elevator passengers on the basis of landing calls and/or destination calls. An optional operational objective of the elevator traffic can also comprise one or more of the following: maximization of transport capacity, reduction of energy consumption caused by elevator traffic, minimization of door-to-door time, reduction of noise caused by elevator traffic, construction-time use of an elevator, use of an elevator during servicing of the elevator assembly, use of an elevator during an operational malfunction of the electricity supply, and also use of an elevator during an emergency such as during an earthquake and/or a fire. This type of diversified control of elevator traffic in order to achieve operational objectives has become possible because the processing capacity and computing capacity of elevator control systems has significantly increased. In one embodiment of the invention the limit value for the maximum permitted loading regarding one or more parts of an elevator assembly varies according the operational objective of the elevator traffic in use at the time.

In a preferred embodiment of the invention a physical magnitude affecting the loading of the aforementioned one or more parts of the elevator assembly is measured and the loading of the aforementioned one or more parts of the elevator assembly is determined on the basis of the measured physical magnitude affecting the loading of one or more parts of the elevator assembly.

One part of an elevator assembly is the end buffer of the elevator hoistway, and the limit value for the maximum permitted loading of the end buffer of the elevator hoistway is preferably the maximum permitted meeting speed of the elevator car and/or the counterweight and the end buffer of the elevator hoistway. In this case the physical magnitude affecting the loading of the end buffer is preferably the speed of the elevator car and/or counterweight.

One part of an elevator assembly is an electric drive of an elevator. The electric drive of an elevator preferably comprises an alternating current motor and also a frequency converter for supplying current to the alternating current motor. Some possible physical magnitudes affecting the loading of one or more parts of the elevator assembly are e.g. the current of the alternating current motor and also the current of the main circuit of the frequency converter. The current loading an alternating current motor causes the temperature of the alternating current motor to rise; likewise the current loading the solid-state switches, such as IGBT transistors, of the main circuit of a frequency converter causes heating of the solid-state switches. Therefore by measuring the currents in question the loading state of an electric drive can be determined fairly accurately.

One part of an elevator assembly is preferably the electrical interface of the elevator assembly; in this case the aforementioned physical magnitude affecting the loading of one or more parts of the elevator assembly is preferably the net current produced in the electrical interface from the operation of the elevator assembly. The term net power refers to the resultant of the currents of different devices of the elevator assembly, such as of the electric drives of the elevator, when calculating which resultant, the direction and magnitude of each current has been taken into account. One physical magnitude affecting the loading of one or more parts of the elevator assembly is the supply voltage of the electrical interface. Reducing the supply voltage might cause an increase in the net current produced in the electrical interface from operation of the elevator assembly.

One physical magnitude affecting the loading of one or more parts of the elevator assembly is the temperature of the air of the elevator hoistway.

One physical magnitude affecting the loading of one or more parts of the elevator assembly is the load of the elevator car.

One physical magnitude affecting the loading of one or more parts of the elevator assembly is the noise level of the one or more parts of the elevator assembly.

An elevator assembly according to the invention comprises an elevator car; an electric drive for moving the elevator car according to the movement profile set for the movement of the elevator car; and also a control apparatus which is arranged to determine a plurality of optional operational objectives for the elevator traffic, to select one or more of these at a time to be implemented as an operational objective of the elevator traffic using the selection criteria of the operational objective, to form a movement profile of the elevator car on the basis of one or more selected operational objectives, to set a limit value for the maximum permitted loading for one or more parts of the elevator assembly, to determine the loading of the aforementioned one or more parts of the elevator assembly, and when it deduces that the loading of the aforementioned one or more parts of the elevator assembly exceeds the limit value for the maximum permitted loading, the control apparatus is arranged to limit the loading of the one or more parts in question of the elevator assembly by modifying the value of the movement magnitude of the elevator car in the movement profile of the elevator car.

In one embodiment of the invention the control apparatus is arranged to limit the loading exerted on the end buffer by reducing the maximum speed of the elevator car in the movement profile of the elevator car stopping at the terminal floor in relation to the maximum speed according to the movement profile of an elevator car stopping elsewhere than at the terminal floor.

In one embodiment of the invention the control apparatus is arranged to reduce the value of the acceleration and/or deceleration and/or maximum speed of an elevator car in the movement profile of the elevator car when the temperature of the air of the elevator hoistway reaches the limit value for the maximum permitted temperature.

In one embodiment of the invention the physical magnitude affecting the loading of one or more parts of the elevator assembly is the power flow occurring via the aforementioned one or more parts of the elevator assembly, and the control apparatus is arranged to limit the net current produced in the electrical interface from the operation of the elevator assembly preferably to the limit value for the maximum permitted net current by modifying the value of the movement magnitude of the elevator car in the movement profile of the elevator car on the basis of the direction and magnitude of the power flowing via one or more parts of the elevator assembly.

In one embodiment of the invention the aforementioned limit value for net current is set during an operational malfunction of the electricity supply of the elevator assembly to be smaller than the electricity supply during normal operation of the electricity supply.

In one embodiment of the invention the elevator assembly preferably comprises an energy storage, which is arranged in a first operating situation to yield electrical energy for moving the elevator car, and also in a second operating situation to receive electrical energy released by movement of the elevator car. The control apparatus is arranged to limit the net current produced in the electrical interface of the elevator assembly from the operation of the elevator assembly preferably to the limit value for the maximum permitted net current by modifying the value of the movement magnitude of the elevator car in the movement profile of the elevator car on the basis of the charge state of the energy storage. In one embodiment of the invention the aforementioned physical magnitude affecting the loading of one or more parts of the elevator assembly is the temperature of the energy storage; in this case the aforementioned control apparatus is arranged to limit the loading of the energy storage to the limit value for the maximum permitted loading by modifying the value of the movement magnitude of the elevator car in the movement profile of the elevator car when the temperature of the energy storage reaches the maximum permitted limit value.

One physical magnitude affecting the loading of one or more parts of the elevator assembly is the amplitude of swaying of the elevator hoistway. In one embodiment of the invention the elevator assembly comprises means for measuring swaying of the elevator hoistway. The means for measuring swaying of the elevator hoistway are preferably fitted into the top part of the elevator hoistway. The means for measuring swaying of the elevator hoistway preferably comprise an acceleration sensor, which is arranged to measure the horizontal acceleration of the elevator hoistway. In one embodiment of the invention the control apparatus is arranged to determine swaying of the elevator hoistway, and if the amplitude of the swaying of the elevator hoistway decreases to below the normal level the control apparatus is arranged to increase the value for the maximum speed of the elevator car in the movement profile of the elevator car to be larger than the maximum speed of the elevator car during the normal level of the amplitude of swaying. In one embodiment of the invention the control apparatus is arranged to reduce the value of the maximum speed of an elevator car in the movement profile of the elevator car if the amplitude of the swaying of the elevator hoistway increases to above the normal level. Swaying of the elevator hoistway can also be determined e.g. from the horizontal movement of a rope/cable suspended in the elevator hoistway occurring preferably in the bottom part of the elevator hoistway. In this case if the horizontal movement of a rope/cable suspended in the elevator hoistway decreases to below the normal level the control apparatus is arranged to increase the value for the maximum speed of the elevator car in the movement profile of the elevator car to be greater than the maximum speed of the elevator car according to the normal level of horizontal movement of the rope/cable in question. In one embodiment of the invention the control apparatus is arranged to reduce the value of the maximum speed of an elevator car in the movement profile of the elevator car if the horizontal movement of a rope/cable suspended in the elevator hoistway increases to above the normal level.

The invention enables elevators to provide service on average closer than prior art to the theoretical top limit of performance of an elevator assembly, said limit being determined by the dimensioning of the different parts of the elevator assembly. Thus, by means of the invention, e.g. one or more of the following operational objectives of the elevator traffic can be achieved:
- an increase in the transport capacity of an elevator assembly
- a reduction on the energy consumption of an elevator assembly
- a reduction of the door-to-door time
- a reduction in the noise caused by elevator traffic
- continuation of the operation of an elevator during an operational malfunction of the electricity supply, such as an outage of the electricity network
- reliable operation of the elevator in connection with construction, servicing and/or renovation of the elevator assembly The aforementioned summary, as well as the additional features and advantages of the invention presented below, will be better understood by the aid of the following description of some embodiments, said description not limiting the scope of application of the invention.

MORE DETAILED DESCRIPTION OF THE PREFERRED EMBODIMENTS OF THE INVENTION

Embodiment 1

Figure 1:
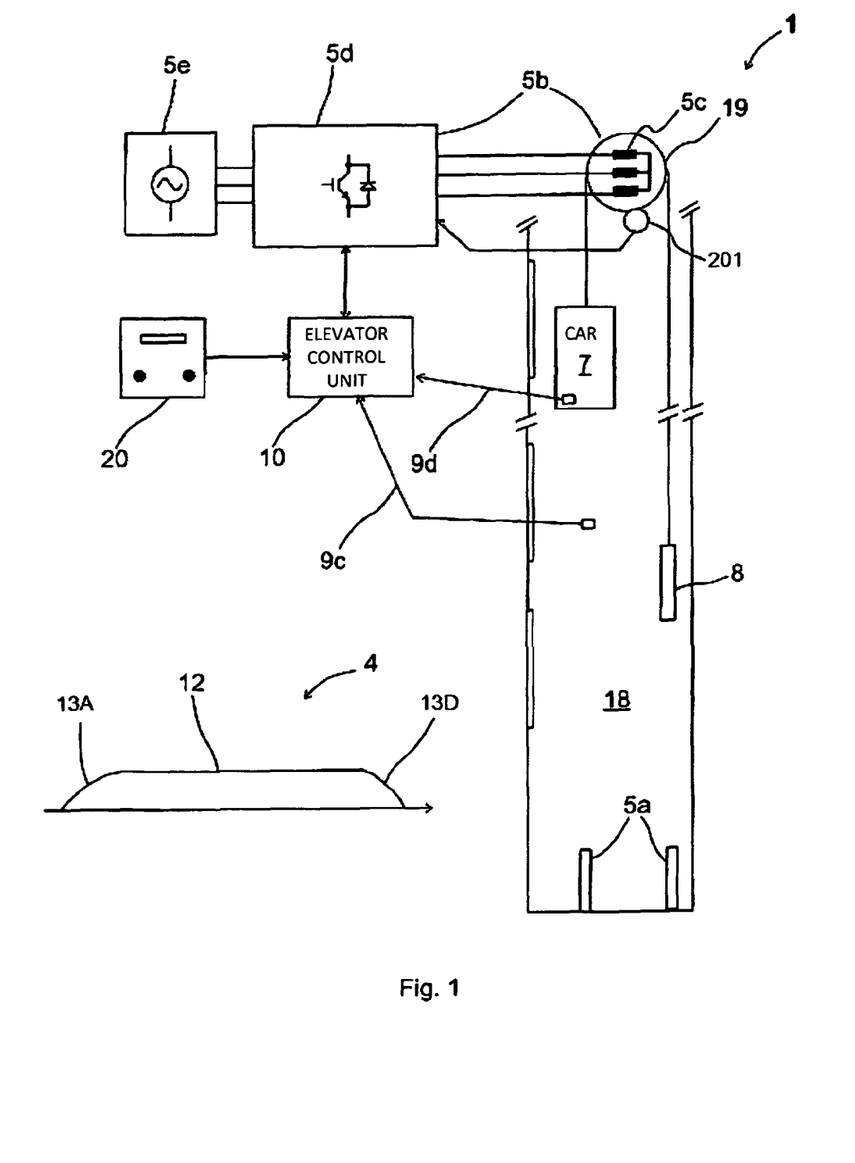
FIG. 1 presents as a block diagram an elevator assembly according to a first embodiment of the invention

The elevator assembly 1 of FIG. 1 comprises an elevator car 7 and also an electric drive 5b for moving the elevator car in the elevator hoistway 18 according to a movement profile 4 of the elevator car formed by the elevator control unit 10. The electric drive 5b comprises a hoisting machine 19 disposed in the top part of the elevator hoistway 18, which hoisting machine comprises an alternating current motor 5c as the power producing part. In addition, the electric drive 5b comprises a frequency converter 5d for supplying variable-amplitude and variable-frequency current to the alternating current motor 5c.

The elevator car 7 and counterweight 8 are suspended in the elevator hoistway 18 with suspension means, such as ropes, a belt or corresponding, passing via the traction sheave of the hoisting machine 19 (in the following the term "elevator rope" will be used generally to refer to said suspension means). The hoisting machine 19 is, in this embodiment of the invention, fixed to the guide rail (not in figure) of the elevator car, in a space between the guide rail and the wall of the elevator hoistway 18. The hoisting machine 19 could, however, also be fixed e.g. to a machine bedplate, and the hoisting machine could also be disposed elsewhere in the elevator hoistway, such as in the bottom part of the elevator hoistway, or the hoisting machine can also be disposed in a machine room instead of in the elevator hoistway.

The elevator control unit 10 sends the movement profile 4 of the elevator car it has formed to the frequency converter 5d via a data transfer bus between the elevator control unit 10 and the frequency converter 5d. The frequency converter 5d measures the speed of rotation of the rotor of the alternating current motor 5c with a speed measurement sensor 201 and sets the torque of the elevator motor by adjusting the current of the elevator motor such that the movement of the rotor of the elevator motor, and thereby of the elevator car 7, adjusts towards the aforementioned movement profile 4 of the elevator car.

The movement profile 4 of the elevator car can be divided into the acceleration phase 13A of a run, a phase 12 of even speed, and also a deceleration phase 13D. The frequency converter 5d starts the deceleration phase of a run when the elevator car has arrived at a predefined distance from the stopping floor. Normally the speed of the elevator car decelerates in a controlled manner at the deceleration determined by the movement profile 4 of the elevator car such that the speed of the elevator car decreases to zero when the elevator car arrives at the stopping floor.

The elevator control unit 10 determines the movement profile 4 of the elevator car on the basis of each respective operational objective of the elevator traffic. An operational objective of the elevator traffic can be selected e.g. by manually entering the selection criterion of the operational objective via the user interface 20 of the elevator control unit 10; an operational objective can in this case comprise one or more of the following:
- construction-time use of an elevator assembly
- use of an elevator assembly during servicing
- use of an elevator assembly in connection with modernization work
- a reduction on the energy consumption of an elevator assembly
- an increase in the transport capacity of an elevator assembly
- a reduction of the door-to-door time of an elevator assembly The aforementioned user interface 20 of the elevator control unit 10 can also be integrated into connection with an entrance of the elevator hoistway, e.g. in the architrave of a landing door.

The elevator assembly can also form an elevator group, which comprises a number of elevators, in which case a selection criterion of an operational objective of the elevator traffic can be formed in the control unit (not in figure) of the elevator group, from where it can be sent onwards to one or more elevator control units 10. The group control unit and/or the elevator control unit can also measure the operation of the elevator assembly and can select the operational objective on the basis of the measured operation of the elevator assembly. The group control unit and/or the elevator control unit 10 can measure e.g. the number of elevator passengers in a unit of time, and if the number of elevator passengers in a unit of time increases to a certain magnitude the increasing of the transport capacity of the elevator assembly can be selected to be implemented as the operational objective of the elevator traffic. If, on the other hand, the number of elevator passengers in a unit of time decreases to a certain value e.g. a reduction in the energy consumption of the elevator assembly and/or a reduction in the noise caused from elevator traffic can be selected to be implemented as the operational objective of the elevator traffic.

The elevator control unit 10 sets a limit value for the maximum permitted loading for one or more parts 5a, 5b, 5c, 5d, 5e of the elevator assembly. The elevator control unit 10 measures a physical magnitude affecting the loading of the aforementioned one or more parts 5a, 5b, 5c, 5d, 5e and determines the loading of the one or more parts 5a, 5b, 5c, 5d, 5e in question of the elevator assembly on the basis of the measured physical magnitude. The elevator control unit 10 limits the loading of the one or more parts 5a, 5b, 5c, 5d, 5e in question of the elevator assembly to the limit value for the maximum permitted loading or to slightly below it by reducing the value of a movement magnitude of the elevator car, at least of the acceleration/deceleration of the elevator car and in certain situations also of the maximum speed of the elevator car, in the movement profile 4 of the elevator car if the loading of one or more parts 5a, 5b, 5c, 5d, 5e of the elevator assembly increases over the limit value for the maximum permitted loading. The elevator control unit 10 measures e.g. the current traveling through one or more solid-state switches (e.g. IGBT transistors) of the frequency converter 5d and limits the value of the acceleration/deceleration of the elevator car in the movement profile 4 of the elevator car if the measured current increases to be larger than the set limit value and if the measured current in question also lasts longer than permitted.

The end buffer 5a of the elevator hoistway is dimensioned to receive a collision of the elevator car 7 at the maximum permitted buffer collision speed at the most. The elevator control unit 10 measures the speed of the elevator car 7 and limits the maximum speed of the elevator car 7 in the movement profile 4 of the elevator car such that the maximum speed of an elevator car approaching the end of the elevator hoistway is limited to a value from which the speed of the elevator car can be decelerated to the maximum permitted buffer collision speed by activating a machinery brake and, if necessary, also the safety gear of the elevator car. In this case, taking into account the braking distance determined on the basis of the deceleration specific to the machinery brake/safety gear, the maximum speed of the elevator car can be greater elsewhere than in the proximity of a terminal floor. Particularly in a situation in which increasing the transport capacity of the elevator assembly has been selected as an operational objective of the elevator traffic, the maximum speed of the phase of even speed of the elevator car can be selected in the movement profile of the elevator car to be greater when the elevator car is stopping elsewhere than at a terminal floor; on the other hand, the maximum speed of the phase of even speed of an elevator car stopping at a terminal floor can also be reduced during a run when the elevator car approaches the end of the elevator hoistway.

The elevator control unit 10 also measures the load 9d of the elevator car and determines on the basis of the measurement the loading exerted on the electric drive 5b/the end buffers 5a of the elevator hoistway utilizing the information that the force difference acting on the different sides of the traction sheave of the hoisting machine 19 is at its smallest in a position of equilibrium, in which case a load of the same weight as the counterweight 8 is loaded into the elevator car 7. When the load of the elevator car 7 changes from this position of equilibrium also the loading exerted on e.g. the machinery brakes of the hoisting machine 19, the elevator motor 5c and the frequency converter 5d increases; therefore the measurement of the load 9d of the elevator car can be utilized for determining the loading of the electric drive 5b and also the buffer collision speed of the end buffers 5a.

The elevator control unit 10 can also measure the temperature 9c of the air of the elevator hoistway with a temperature sensor, such as with an NTC thermistor, fitted into the elevator hoistway. The temperature 9c of the air of the elevator hoistway affects the stressing of a number of parts of the elevator assembly, such as the electric drive 5b of the elevator (if the electric drive 5b of the elevator is disposed in the elevator hoistway) and the stressing of other electronics components and sensors situated in the elevator hoistway; additionally; the temperature of the elevator hoistway affects, inter alia, the endurance of rotating parts, such as bearings and diverting pulleys, the endurance of polyurethane-coated traction sheaves and diverting pulleys, et cetera. The elevator control unit 10 limits the loading of the one or more parts in question of the elevator assembly to the limit value for the maximum permitted loading or to slightly below it by reducing the acceleration/deceleration of the elevator car, and possibly also the maximum speed of the elevator car, in the movement profile of the elevator car, if the temperature of the air of the elevator hoistway reaches the limit value for the maximum permitted temperature.

Further, the elevator control unit 10 also determines the operating state of the primary electricity supply 5e of the elevator assembly 1, and when it detects an operational malfunction of the primary electricity supply the elevator control unit limits the acceleration/deceleration of the elevator car in the movement profile of the elevator car such that the current supply capacity of the backup power apparatus (not in figure) to be used during the operational malfunction of the primary electricity supply is not exceeded.

Embodiment 2

Figure 2:
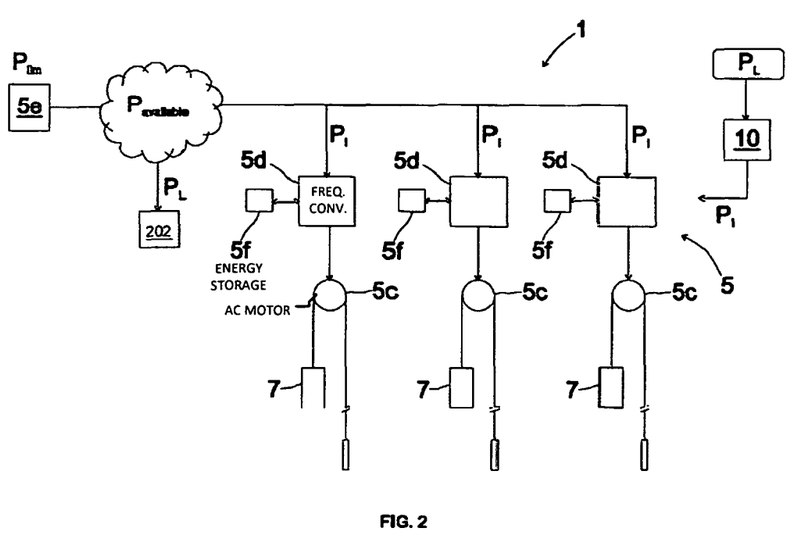
FIG. 2 presents as a block diagram an elevator assembly according to a second embodiment of the invention

The elevator assembly 1 of FIG. 2 comprises a number of elevator cars 7 and also electric drives for moving the elevator cars in the elevator hoistways according to a movement profile 4 of the elevator car formed by the elevator control unit 10. Each of the electric drives comprises a hoisting machine disposed in the elevator hoistway, which hoisting machine comprises an alternating current motor 5c as the power producing part. In addition, each of the electric drives comprises a frequency converter 5d for supplying variable-amplitude and variable-frequency current to the alternating current motor 5c. The frequency converters 5d are of the type that brake to the network and for this reason they comprise a network inverter rectifier. Each of the frequency converters 5d is connected between the alternating current motor 5c and the electricity distribution network 5e of the building such that power can be supplied with a frequency converter 5d in both directions between the electricity distribution network 5e of the building and the alternating current motor 5c. When the force effect of the alternating current motor 5c is of the opposite direction with respect to the direction of movement of the elevator car 7, power flows from the alternating current motor 5c via the inverter of the frequency converter 5d to the DC intermediate circuit of the frequency converter, from where the power is supplied onwards to the electricity distribution network 5e of the building with the network inverter rectifier. When, on the other hand, the force effect of the alternating current motor 5c is of the same direction as the direction of movement of the elevator car 7, the direction of the power flow is from the electricity distribution network 5e of the building towards the alternating current motor 5c. Additionally, in this embodiment of the invention an energy storage 5f is connected in connection with the DC intermediate circuit of each frequency converter 5d. The energy storage 5f comprises e.g. a supercapacitor and/or a lithium-ion accumulator and/or a flywheel, and it is connected to the DC intermediate circuit of the frequency converter with a DC/DC converter. The DC/DC converter comprises a controllable solid-state switch, by switching which power is supplied between the energy storage 5f and the DC intermediate circuit of the frequency converter 5d.

Power is also supplied via the electricity distribution network 5e of the building to all the loads 202 that are external to the elevator assembly 1. These types of loads 202 external to the elevator assembly 1 to be connected to the electricity distribution network 5e of the building are e.g. a lighting system, heating system, air-conditioning and security systems of the building and also different control & notification systems of users of the building; additionally, in large buildings the aforementioned loads 202 can be e.g. travelators and escalators. The electricity distribution network 5e of the building is connected to the public electricity network via the main distribution board of the building. The current endurance of the fuses of the main distribution board determines the limit value Plim for power supply between the public electricity network and the electricity distribution network 5e of the building.

The elevator control apparatus, e.g. the elevator control unit 10 or the group control unit, comprises an input for measuring data relating to the aggregate power consumption PL of loads 202 that are external to the elevator system and that are connected to the electricity distribution network of the building. The elevator control apparatus determines the power-handling capacity Pavailable, available to the elevator assembly, of the electricity distribution network of the building. When the positive travel directions of the power flows are selected to be in the direction of the arrows marked in FIG. 2, the following equation regarding the power flow directed from the frequency converters 5d towards the electricity distribution network 5e of the building is obtained for the power-handling capacity Pavailable, available to the elevators, of the electricity distribution network 5e of the building:

$$P_{available} = P_{lim} + P_L$$

In addition, the following equation regarding the power flow directed from the electricity distribution network 5e of the building towards the frequency converters 5d is obtained for the power-handling capacity $P_{available}$, available to the elevator assembly, of the electricity distribution network 5e of the building:

$$P_{available} = P_{lim} - P_L$$

Further, the elevator control apparatus also determines the operating state of the electricity distribution network 5e of the building, and when it detects an operational malfunction of the electricity distribution network 5e of the building, such as a voltage reduction or electricity outage, the elevator control apparatus determines the power-handling capacity $P_{available}$, available to the elevator assembly, of the electricity distribution network 5e of the building for the power flow directed from the frequency converters 5d to the electricity distribution network 5e of the building from the equation:

$$P_{available} = P_L$$

In addition, the elevator control apparatus determines the power-handling capacity $P_{available}$ available to the elevator assembly, of the electricity distribution network 5e of the building for the power flow directed from the electricity distribution network 5e of the building to the frequency converters 5d from the equation:

$$P_{available} = -P_L$$

The elevator control apparatus also determines for each frequency converter 5d of the elevator assembly 1 an individual limit value $P_i$ for the maximum permitted power supply such that the net power to be supplied between the frequency converters 5d and the electricity distribution network 5e of the building does not exceed the power-handling capacity Pavailable, available to the elevator assembly, of the electricity distribution network of the building:

$$P_{available} \geq \sum_{i=1}^{N} P_i$$

The elevator control apparatus determines the limit value Pi for the maximum permitted power supply on the basis of the charge state of the energy storage 5f connected to the DC intermediate circuit of a frequency converter 5d such that the energy storage 5f can either be charged by supplying to the energy storage 5f the part of the power flowing from the alternating current motor 5c to the frequency converter 5d that exceeds the limit value $P_i$ for the maximum permitted power supply or by discharging from the energy storage 5f the part of the power flowing via the frequency converter 5d to the alternating current motor 5c that exceeds the limit value $P_i$ for the maximum permitted power supply. It should be noted here that the aforementioned limit value $P_i$ for the maximum permitted power supply of the frequency converter is dependent on direction and it has a different value regarding the power flow (marked $P_{i1}$) directed from the frequency converter 5d to the electricity distribution network 5e of the building compared to the power flow (marked $P_{i2}$) directed from the electricity distribution network 5e of the building to the frequency converter 5d. Therefore the limit value $P_{i1}$ for the power supply directed from the frequency converter 5d to the electricity distribution network of the building can be reduced when the amount of energy that can be stored in the energy storage increases, whereas the limit value $P_{i2}$ for the power supply directed from the electricity distribution network 5e of the building to the frequency converter can be reduced when the amount of energy that can be discharged from the energy storage increases. When the energy storage is formed from supercapacitors, the charge state of the energy storage can be determined from the voltage between the poles of a supercapacitor, because an increase in voltage indicates that energy is being charged into the supercapacitor. The charge state of the energy storage in connection with the accumulators can be determined more precisely e.g. by integrating the current of the accumulators in relation to time.

Each of the elevator control units 10 limits the power flow occurring between the electricity distribution network 5e of the building and a frequency converter 5d to the limit value Pi for the maximum permitted power supply, or to slightly below it, by modifying the value of the acceleration and/or deceleration and/or maximum speed of the elevator car in the movement profile of the elevator car such that the current flowing via the connection between the frequency converter 5d and the electricity distribution network 5e of the building does not exceed the limit value for the maximum permitted current according to the limit value Pi for the maximum permitted power supply.

Figure 3:
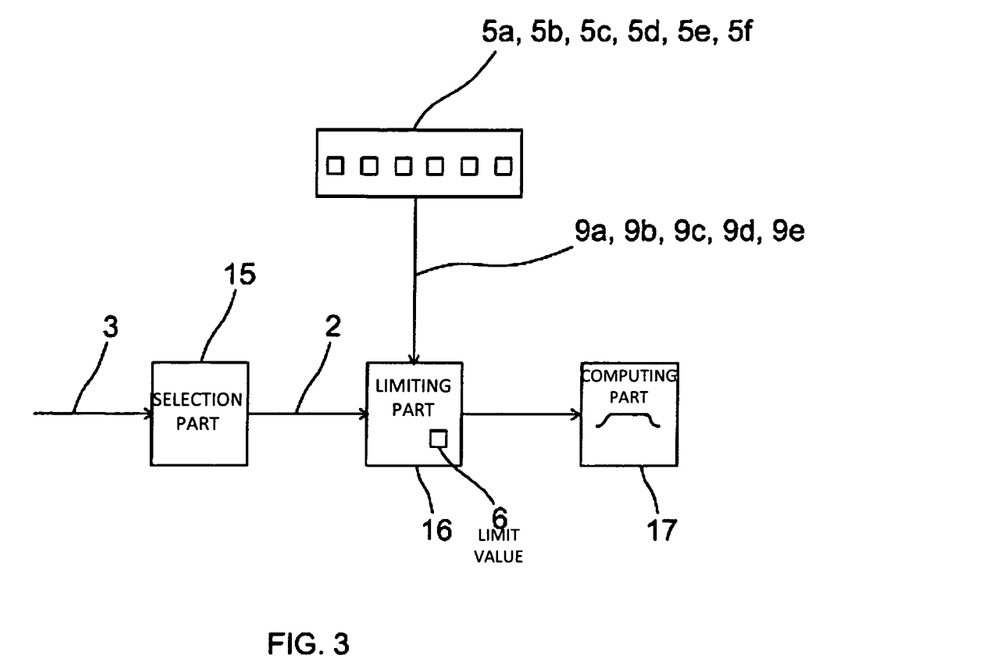
FIG. 3 presents as a block diagram a control apparatus according to the invention

FIG. 3 presents as a block diagram one possible implementation for limiting the loading of an elevator assembly. The solution according to FIG. 3 can be fitted into the software of e.g. an elevator control apparatus, such as a group control unit/elevator control unit 10, according to FIG. 1 or 2. The software of the elevator control apparatus comprises a selection part 15 of the operational objective of the elevator traffic, which selection part selects from a plurality of optional operational objectives one or more at a time to be implemented as an operational objective of the elevator traffic on the basis of the selection criteria 3 received. The selection part 15 of an operational objective expresses, as parameters 2 of the movement profile of the elevator car, the selected operational objective to be used to the limiting part 16 of loading. The limiting part 16 of loading receives measurement data from sensors measuring a physical magnitude 9a, 9b, 9c, 9d, 9e affecting the loading of the different parts 5a, 5b, 5c, 5d, 5e, 5f of the elevator assembly and determines the loading state of the parts 5a, 5b, 5c, 5d, 5e, 5f in question of the elevator assembly on the basis of the measurement data received. If the limiting part 16 of loading deduces that one or more of the parts 5a, 5b, 5c, 5d, 5e, 5f in question of the elevator assembly exceeds the limit value for the maximum permitted loading the limiting part 16 of loading limits the loading of the parts 5a, 5b, 5c, 5d, 5e, 5f in question of the elevator assembly that exceed the limit value for the maximum permitted loading to the limit value 6 for the maximum permitted loading or to slightly below the limit value 6 for the maximum permitted loading by modifying one or more parameters of the movement profile of the elevator car such that the modified movement profile of the elevator car causes a reduction in the loading of the one or more parts 5a, 5b, 5c, 5d, 5e, 5f of the elevator assembly that achieves the limit value(s) of the maximum permitted loading in question. The limiting part 16 of loading communicates the modified movement parameters of the elevator car to the computing part 17 of the movement profile of the elevator car, which computing part forms the final movement profile of the elevator car.

The invention is not only limited to be applied to the embodiments described above, but instead many variations are possible within the scope of the inventive concept defined by the claims below.

The invention claimed is:

1. A method for protecting an elevator assembly, the method comprising:
   determining a plurality of operational objectives for elevator traffic;
   selecting one or more of the plurality of operational objectives to be implemented as an operational objective of the elevator traffic based on selection criteria for the operational objective of the elevator traffic;
   forming a movement profile for an elevator car based on the one or more selected operational objectives;
   measuring a physical magnitude of a parameter for the one or more parts of the elevator assembly;
   determining whether the measured physical magnitude of the parameter exceeds a threshold maximum value of the physical magnitude of the parameter; and
   decreasing at least one movement magnitude value of the elevator car in the movement profile for the elevator car when the measured physical magnitude of the parameter for the one or more parts of the elevator assembly exceeds the threshold maximum value of the physical magnitude of the parameter for the one or more parts of the elevator assembly.

2. The method according to claim 1, wherein loading on the one or more parts of the elevator assembly is determined based on the measured physical magnitude of the parameter for the one or more parts of the elevator assembly.

3. The method according to claim 1, wherein the one or more parts of the elevator assembly includes an end buffer of an elevator hoistway, and the threshold maximum value is a maximum permitted meeting speed of the end buffer and at least one of the elevator car and a counterweight.

4. The method according to claim 3, wherein the measured physical magnitude is the speed of at least one of the elevator car and the counterweight.

5. The method according to claim 1, wherein the one or more parts of the elevator assembly includes an electric drive of the elevator assembly.

6. The method according to claim 5, wherein the electric drive of the elevator comprises:
   an alternating current motor; and
   a frequency converter configured to supply current to the alternating current motor.

7. The method according to claim 1, wherein the one or more parts of the elevator assembly includes an electrical interface of the elevator assembly.

8. The method according to claim 7, wherein the parameter is current, and the measured physical magnitude of the parameter is a net current produced in the electrical interface from operation of the elevator assembly.

9. The method according to claim 2, wherein the parameter is temperature, and the measured physical magnitude of the parameter is a temperature of air in an elevator hoistway.

10. The method according to claim 2, wherein the measured physical magnitude is a load of the elevator car.

11. An elevator assembly comprising:
    an electric drive configured to move an elevator car according to a movement profile determined for movement of the elevator car; and
    a control apparatus configured to,
       determine a plurality of operational objectives for elevator traffic,
       select one or more of the plurality of operational objectives to be implemented as an operational objective of the elevator traffic based on selection criteria for the operational objective of the elevator traffic,
       form a movement profile for the elevator car based on the one or more selected operational objectives of the elevator traffic,
       measure a physical magnitude of a parameter for the one or more parts of the elevator assembly;
       determine whether the measured physical magnitude exceeds a threshold maximum value of the physical magnitude of the parameter for the one or more parts of the elevator assembly, and
       decrease at least one movement magnitude value of the elevator car in the movement profile for the elevator car when the measured physical magnitude the parameter for the one or more parts of the elevator assembly exceeds the threshold maximum value of the physical magnitude of the parameter for the one or more marts of the elevator assembly.

12. The elevator assembly according to claim 11, wherein the movement profile is a movement profile for the elevator car when stopping at a terminal floor, and the at least one movement magnitude value includes a maximum speed of the elevator car, and wherein the control apparatus is further configured to decrease the maximum speed of the elevator car in the movement profile for the elevator car when stopping at the terminal floor relative to a maximum speed of the elevator car in the movement profile for the elevator car when stopping at a floor other than the terminal floor.

13. The elevator assembly according to claim 11, wherein the at least one movement magnitude value includes a value of at least one of acceleration, deceleration, and maximum speed of the elevator car, and wherein the control apparatus is configured to decrease the value of at least one of the acceleration, the deceleration and the maximum speed of the elevator car when a temperature of air in an elevator hoistway reaches the threshold maximum value.

14. The elevator assembly according to claim 11, wherein the measured physical magnitude is a measured power flow occurring via the one or more parts of the elevator assembly.

15. The elevator assembly according to claim 11, further comprising:

an energy storage configured to yield electrical energy for moving the elevator car, and to receive electrical energy released by movement of the elevator car; wherein the control apparatus is further configured to limit a net current produced in an electrical interface of the elevator assembly from the operation of the elevator assembly by decreasing the at least one movement magnitude value of the elevator car in the movement profile of the elevator car based on a charge state of the energy storage.

16. The elevator assembly of claim 14, wherein the measured physical magnitude is a flow of net power occurring via the one or more parts of the elevator assembly, and the threshold maximum value is a maximum permitted net power, and wherein the control apparatus is configured to decrease the at least one movement magnitude value of the elevator car in the movement profile for the elevator car when the flow of net power occurring via the one or more parts of the elevator assembly exceeds the maximum permitted net power.

* * * * *